Figure 2:
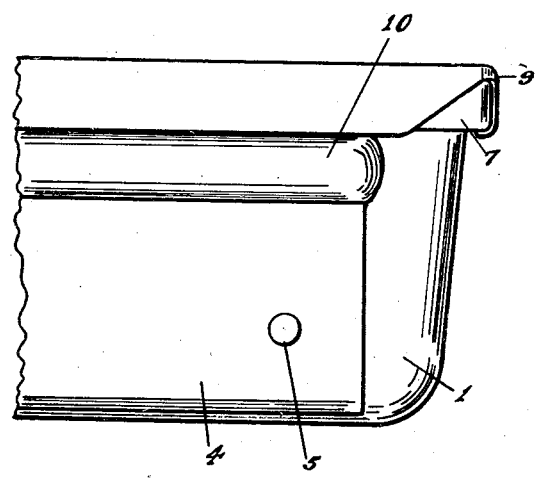
Figure 3:
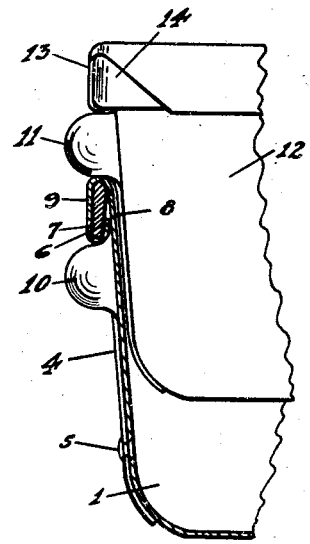
Figure 1:
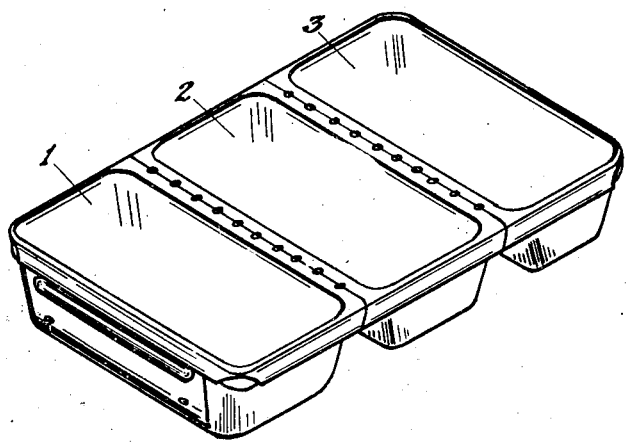
Figure 4:
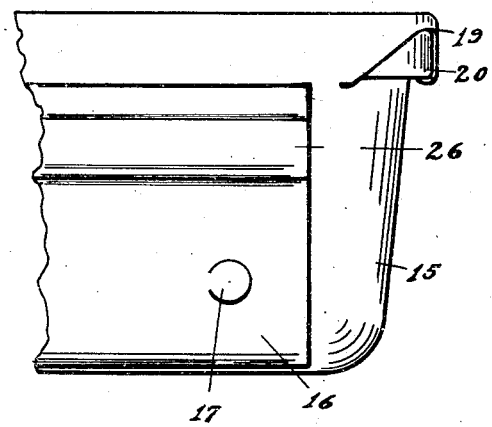
Figure 5:
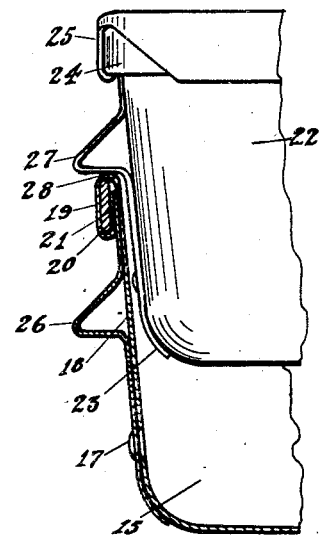

Dec. 18, 1928.

J. G. JACKSON 1,696,004

BAKING PAN

Filed June 4, 1927

2 Sheets-Sheet 1

Joseph George Jackson.
Inventor.
Attorney.

Dec. 18, 1928.

J. G. JACKSON 1,696,004

BAKING PAN

Filed June 4, 1927

2 Sheets-Sheet 2

Joseph George Jackson.
Inventor.
W. A. Darrah.
Attorney.

Patented Dec. 18, 1928.

1,696,004

UNITED STATES PATENT OFFICE.

JOSEPH GEORGE JACKSON, OF CHICAGO, ILLINOIS, ASSIGNOR TO EDWARD KATZINGER COMPANY, OF CHICAGO, ILLINOIS, A CORPORATION OF ILLINOIS.

BAKING PAN.

Application filed June 4, 1927. Serial No. 196,612.

This invention relates to containers formed from sheet metal and frequently from tin plate. Containers of this kind are widely used in the baking industry, particularly by wholesale bakeries for the making of bread, cake and similar articles.

The object of this invention is to provide a simple, efficient, economical equipment with certain mechanical advantages both in handling and using which will be later set forth.

Referring to the drawing:

Fig. I shows a perspective view of a set of pans united together in a manner typical of my invention;

Fig. II shows a detail of the corner portion of one of the end pans of the set shown in Fig. I;

Fig. III shows another detail partly in section of the corner of one pan of the set shown in Fig. I and a corresponding portion of a second pan nested within the first pan the condition disclosed being further representative of what will occur when two or more individual sets of pans, as shown in Fig. I are nested together;

Fig. IV shows a corner detail of the end pan of Fig. I modified slightly from the construction shown in Fig. II;

Fig. V shows a detail partly in section of the end pan indicated in Fig. IV with a second pan nested within the first pan and indicates the general condition which will obtain if two sets of pans made in accordance with the details given in Figures IV and V are nested together.

It will be understood that my invention may be applied to one pan or a set of pans, but under present commercial conditions pans of the type commonly used are manufactured most often in groups or sets of any number ranging from two to in some cases six or eight. It will be understood that the number of pans in the set has no bearing on my invention.

The pans may be constructed individually in a great many ways, the drawings merely showing one preferred form.

Referring to the drawings:

(1), (2) and (3) represent a set of three pans united together in accordance with the usual practice in the construction of this class of container. The individual pans may be constructed substantially identical, each with the other before being assembled into the set. The end pans of the set, however, are provided with a protection plate (4) extending for a considerable distance along the outer edge of the end pan (1). The protection plate may be riveted, spot welded or otherwise attached to the outside wall of the pan. (5) indicates a rivet for holding the protection plate to the pan near its lower portion. The upper side of said protection plate (4) may be fastened to the pan in any desired way. I have indicated that the upper edge (6) is pressed under strap (7) which extends along the sides of the series of pans serving to reinforce them and unite them together. The wall of the pan indicated by (8) is bent outward and downward as shown at (9) so as to surround and hold in place strap (7). Many other methods may be employed for constructing these pans and I do not wish to be confined to the exact details here disclosed as they merely represent one commercial and satisfactory manner of accomplishing the desired end.

The pans are shown as if drawn from a single sheet of metal which is a preferred construction, but not essential as the pans may be folded or shaped by any desired process.

Protection plate (4) is drawn or formed to have a projection (10) extending in a horizontal direction. The projection (10) is shown in Figures II and III as being near the upper portion of the protection plate and slightly below strap member (7). I wish to point out, however, that the projection (10) may be located at any desired point or may be of any desired contour or shape. The form shown in Figures II and III represents a projection closed on all sides and in close contact with the pan, thus making a tight joint with the sides of the pan. Such a formation serves to prevent the entrance of dough, grease or other materials into the space formed between the projection (10) and the wall of the pan. This is, of course, highly desirable as materials entering this space will tend to decay resulting in an unsanitary condition.

Projection member (10) extends outward away from the side of the pan a sufficient distance, so that when the pan is placed within another pan in the condition which is described as "nesting" the projection (10) will serve to limit the amount that the inner pan will enter the outer pan. It will be noted, of course, from the drawings that the slope or draft on the walls of the pans will permit a certain amount of nesting. If the pans are not provided with stops or projections, or some expedient to accomplish the result produced by projection (10) the pans will obviously nest one within the other until the adjacent strap members will be substantially in contact. This condition materially reduces the radiation surface available for cooling the pans and, therefore, materially increases the time required for cooling. It is, therefore, desirable to maintain a certain definite spacing between adjacent pans when nested as will be subsequently set forth.

Referring to Fig. III (11) indicated a projection on a second pan (12) which is nested into pan (1). (13) indicates the edge of pan (12) which contains strap member (14) of pan (12). It will be apparent from Fig. III that projection (11) serves to limit the distance which pan (12) enters pan (1) and, therefore, accomplishes the result previously described.

In Fig. IV (15) indicates a pan which may be considered the end pan of a set being analogous, therefore, to pan (1) as previously described.

Pan (15) is provided with a protection plate (16) which is attached to pan (15) in any desired manner. I have shown protection plate (16) riveted to pan (15) by rivet (17) although obviously spot welding or other expedients may be employed if desired. Pan (15) has a side wall (18) which extends outwardly and downwardly as indicated by (19) and surrounds a strapping member (20). Protection plate (16) at its upper portion (21) is shown extending between strap member (20) and pan wall (18) this construction serving in conjunction with rivet (17) to locate and hold plate (16) in position.

(22) indicates a second pan similar to (15) but nested within (15). (23) indicates the protection plate on pan (22) while (24) indicates the strap member surrounded by edge (25) of pan (22). Protection plate (16) is provided with a ridge or extension portion (26) which may be bent or drawn or formed as desired. (27) indicates a corresponding projecting portion of protecting plate (23) on pan (22). It will be apparent that the lower portion (28) of extension projection (27) rests on the upper portion of the upper edge of pan (15) just above strap member (20) thus serving to control the distance that (22) will enter into pan (15) when the respective sets of pans are nested.

It will be noted that the contacting portion of the projecting member with the top of the pan below, is substantially horizontal at the point of contact. This is shown clearly in Figure III and Figure V. Thus in Figure III the lower portions of projection (11) at point of contact with edge of pan near point (9) is substantially horizontal. In the same way the contacting portion of expansion (27) where it meets top ends of lower pan (28) is substantially horizontal. The object of this construction is of course to prevent wedging which would make the pans stick together, particularly on cooling and also more difficult to separate.

It will be apparent that one of the essential features of this invention is to produce in a practical commercial way some form of projection or stop such as is indicated by numbers (26) and (27) such stops being arranged to come into contact with some predetermined portion of the next adjacent set of pans when the two sets of pans are nested together.

It will be apparent from the above description that I have provided means for separating sets of pans when nested so that they will not become wedged or forced together due to their own weight or the method of handling. This is of great importance in the case of certain set of pans in that if pans become tightly wedged together they are slow to cool, hard to handle and separate, and also likely to be dented or deformed. It will be understood that many possible variations of my device can be made and still come within the scope of this invention. Thus the actual shape, size, thickness or composition of the material is not essential. It is, of course, desirable to make a strong rugged structure which will stand the strains and abuse of commercial handling.

Having now fully described my invention what I claim as new and wish to secure by Letters Patent in the United States is as follows:

1. In a set of baking pans a side plate located adjacent to the outer wall of the outer pans of said set, said side plate carrying a substantially flat horizontally extending supporting projection, reaching beyond the upper edge of said pan.

2. In a set of baking pans a substantially flat horizontally extending supporting projection on the outer wall of a pan, said supporting portion projection extending horizontally beyond the upper edge of said pan.

JOSEPH GEORGE JACKSON.